US011270010B2

(12) United States Patent
Jami et al.

(10) Patent No.: US 11,270,010 B2
(45) Date of Patent: Mar. 8, 2022

(54) METHOD AND SYSTEM FOR BIOMETRIC TEMPLATE PROTECTION

(71) Applicant: Tata Consultancy Services Limited, Mumbai (IN)

(72) Inventors: Santosh Kumar Jami, Hyderabad (IN); Krishna Rao Kakkirala, Hyderabad (IN); Srinivasa Rao Chalamala, Hyderabad (IN); Ajeet Kumar Singh, Pune (IN); Arun Kumar Jindal, Gurgaon (IN); Balakrishna Gudla, Hyderabad (IN); Bala Mallikarjunarao Garlapati, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 429 days.

(21) Appl. No.: 16/572,217

(22) Filed: Sep. 16, 2019

(65) Prior Publication Data

US 2020/0089899 A1 Mar. 19, 2020

(30) Foreign Application Priority Data

Sep. 14, 2018 (IN) .............................. 201821034737

(51) Int. Cl.
| | | |
|---|---|---|
| *G06F 21/32* | (2013.01) | |
| *G06F 21/62* | (2013.01) | |
| *G06N 3/02* | (2006.01) | |
| *H04L 9/32* | (2006.01) | |
| *H04L 29/06* | (2006.01) | |

(52) U.S. Cl.
CPC .............. *G06F 21/62* (2013.01); *G06F 21/32* (2013.01); *G06N 3/02* (2013.01); *H04L 9/3231* (2013.01); *H04L 63/0414* (2013.01); *H04L 63/0861* (2013.01)

(58) Field of Classification Search
CPC ....... G06F 21/62; G06F 21/32; H04L 9/3231; H04L 63/0861; H04L 63/0414; G06K 9/00026; G06N 3/02
See application file for complete search history.

(56) References Cited

U.S. PATENT DOCUMENTS

| | | | | |
|---|---|---|---|---|
| 10,515,204 | B2 * | 12/2019 | Beatson | ................. G06F 21/45 |
| 10,600,226 | B2 * | 3/2020 | Yam | ....................... G06T 13/40 |
| 2010/0046808 | A1 | 2/2010 | Connell et al. | |

(Continued)

*Primary Examiner* — Jayesh M Jhaveri
(74) *Attorney, Agent, or Firm* — Finnegan, Henderson, Farabow, Garrett & Dunner, LLP

(57) ABSTRACT

Biometric templates (template) are used to store biometric data of one or more users. As biometric data of each user is unique and non-replaceable, template security is a major concern. This disclosure relates generally to template protection, and more particularly to a method and system for biometric template protection. The system generates a final perturbation value for data in the template, based on a first binary code (BC), a second binary code (BC'), feature vectors corresponding to data in the template, and an initial random perturbation. The final perturbation and the feature vectors are mapped to the first binary code. The first binary code represents the template. Every time the first binary code is compromised, the value of first binary code is updated, and the whole process is repeated to generate corresponding final perturbation and then the mapping is done.

15 Claims, 3 Drawing Sheets

(56) References Cited

U.S. PATENT DOCUMENTS

| | | |
|---|---|---|
| 2010/0205658 A1 | 8/2010 | Griffin |
| 2014/0078061 A1* | 3/2014 | Simons .................. G06F 21/32 |
| | | 345/163 |
| 2014/0092015 A1* | 4/2014 | Xing .................. G06K 9/00281 |
| | | 345/158 |
| 2017/0222809 A1* | 8/2017 | Takahashi ............... G06F 21/32 |

* cited by examiner

METHOD AND SYSTEM FOR BIOMETRIC TEMPLATE PROTECTION

PRIORITY CLAIM

This U.S. patent application claims priority under 35 U.S.C. § 119 to: India Application No. 201821034737, filed on Sep. 14, 2018. The entire contents of the aforementioned application are incorporated herein by reference.

TECHNICAL FIELD

This disclosure relates generally to biometric template protection, and more particularly to method and system for biometric template protection by generating perturbations corresponding to biometric data in a biometric template and by mapping the perturbations and feature vectors of the biometric data to a binary code assigned to the biometric data in the biometric template.

BACKGROUND

Biometric data such as finger prints, iris print, and so on, which are unique to each individual, are being used for the purpose of authenticating users in various applications. For example, the biometric data being a unique property/characteristic of each individual, can be used as means for identifying individuals (say as part of a crime investigation process). In another example, when identity of an individual is to be verified, say while the individual is applying for a bank loan or while buying a SIM card for his/her mobile, biometric data can be used to identify and verify identity of the user. Biometric data collected is stored in biometric templates.

The inventors here have recognized several technical problems with such conventional systems, as explained below. Just like any other data, the biometric data also is prone to have data security issues. Data theft has become a common issue. Usually data such as ATM PIN, email password and so on are compromised, users have option for changing the PIN/password. However, biometric data being unique, cannot be changed under any circumstances. So if the biometric falls to wrong hands, that can cause damages/effects which are difficult to deal with.

Various means are being used for ensuring data security in different applications. One of the examples is an encryption-decryption mechanism in which access to data is restricted or controlled using public keys and private keys. There are certain other mechanisms being developed to ensure biometric data security. One of the existing systems designed to provide biometric data security generates cancellable biometric by using a transform pixel operation to combine a pattern with a biometric image to be protected. In another existing mechanism for biometric data protection, a cancellable biometric reference template is generated corresponding to a biometric data to be protected, and the cancellable biometric reference template, which represents the original biometric data, is used for verification purposes (hence there is no need to provide actual biometric data).

SUMMARY

Embodiments of the present disclosure present technological improvements as solutions to one or more of the above-mentioned technical problems recognized by the inventors in conventional systems. For example, in one embodiment, a method for biometric data protection is provided. Initially, a biometric template comprising at least one biometric data computed from biometric input pertaining to a user, is collected as input, via one or more hardware processors of a system. Further, a first binary code (BC) is generated and assigned to a class of the biometric data in the biometric template, via the one or more hardware processors. Further, a second binary code (BC') is generated by collecting an initial random perturbation and a plurality of feature vectors pertaining to the at least one biometric data as input, via the one or more hardware processors, by a neural network of the system. Then, till BC' is at least equal to BC, the following steps are executed:

i. comparing BC and BC' to compute an error between BC and BC', via the one or more hardware processors, by a perturbations computation and updation module of the system;

ii. computing perturbations as a function of gradients of the first neural network, based on the error generated at the perturbations computation and updation module (i.e. the error between BC and BC'), via the one or more hardware processors;

iii. processing the computed perturbations to the initial random perturbation to generate a cumulative perturbation, via the one or more hardware processors; and iv. updating BC' based on the plurality of feature vectors and the cumulative perturbations.

Further, when BC' is equal to BC, the following steps are executed:

v. computing value of final perturbation as equal to the cumulative perturbation; and vi. mapping the final perturbation and the plurality of feature vectors to the first binary code.

In another aspect, a system for biometric template protection is provided. The system includes a neural network; a perturbations computation and updation module; an initial perturbations generation module; a memory module storing a plurality of instructions; one or more communication interfaces; and one or more hardware processors coupled to the memory module via the one or more communication interfaces. The one or more hardware processors are configured by the instructions to execute the following steps:

Initially, a biometric template comprising at least one biometric data computed from the biometric input pertaining to a user, is collected as an input. Further, a first binary code (BC) is generated and assigned to a class of the biometric data in the biometric template using the initial perturbations generation module. Further, a second binary code (BC') is generated by processing an initial random perturbation and a plurality of feature vectors pertaining to the at least one biometric data as input, for the neural network. Then, till BC' is at least equal to BC, the following steps are executed:

vii. compare BC and BC' to generate an error between BC and BC', for the perturbations computation and updation module;

viii. compute perturbations as a function of gradients of the neural network, based on the error between BC and BC', generated at the perturbations computation and updation module;

ix. process the computed perturbations to the initial random perturbation to generate a cumulative perturbation; and x. update BC' based on the plurality of feature vectors and the cumulative perturbations.

Further, when BC' is equal to BC, the following steps are executed:

xi. compute value of final perturbation as equal to the cumulative perturbation; and xii. map the final perturbation and the plurality of feature vectors to the first binary code.

In yet another aspect, a non-transitory computer readable medium for biometric data protection is provided. Initially, a biometric template comprising at least one biometric data computed from the biometric input pertaining to a user, is collected as input, via one or more hardware processors of the system. Further, a first binary code (BC) is generated and assigned to a class of the biometric data in the biometric template, via the one or more hardware processors. Further, a second binary code (BC') is generated by processing an initial random perturbation and a plurality of feature vectors pertaining to the at least one biometric data as input, via the one or more hardware processors, by a neural network of the system. Then, till BC' is at least equal to BC, the following steps are executed:

xiii. comparing BC and BC', via the one or more hardware processors, by perturbations computation and updation module of the system;

xiv. computing perturbations as a function of gradients of the neural network, based on an error generated at the perturbations computation and updation module for BC and BC', via the one or more hardware processors;

xv. processing the computed perturbations and the initial random perturbation to generate a cumulative perturbation, via the one or more hardware processors; and xvi. updating BC' based on the plurality of feature vectors and the cumulative perturbations.

Further, when BC' is equal to BC, the following steps are executed:

xvii. compute value of final perturbation as equal to the cumulative perturbation; and xviii. mapping the final perturbation and the plurality of feature vectors to the first binary code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
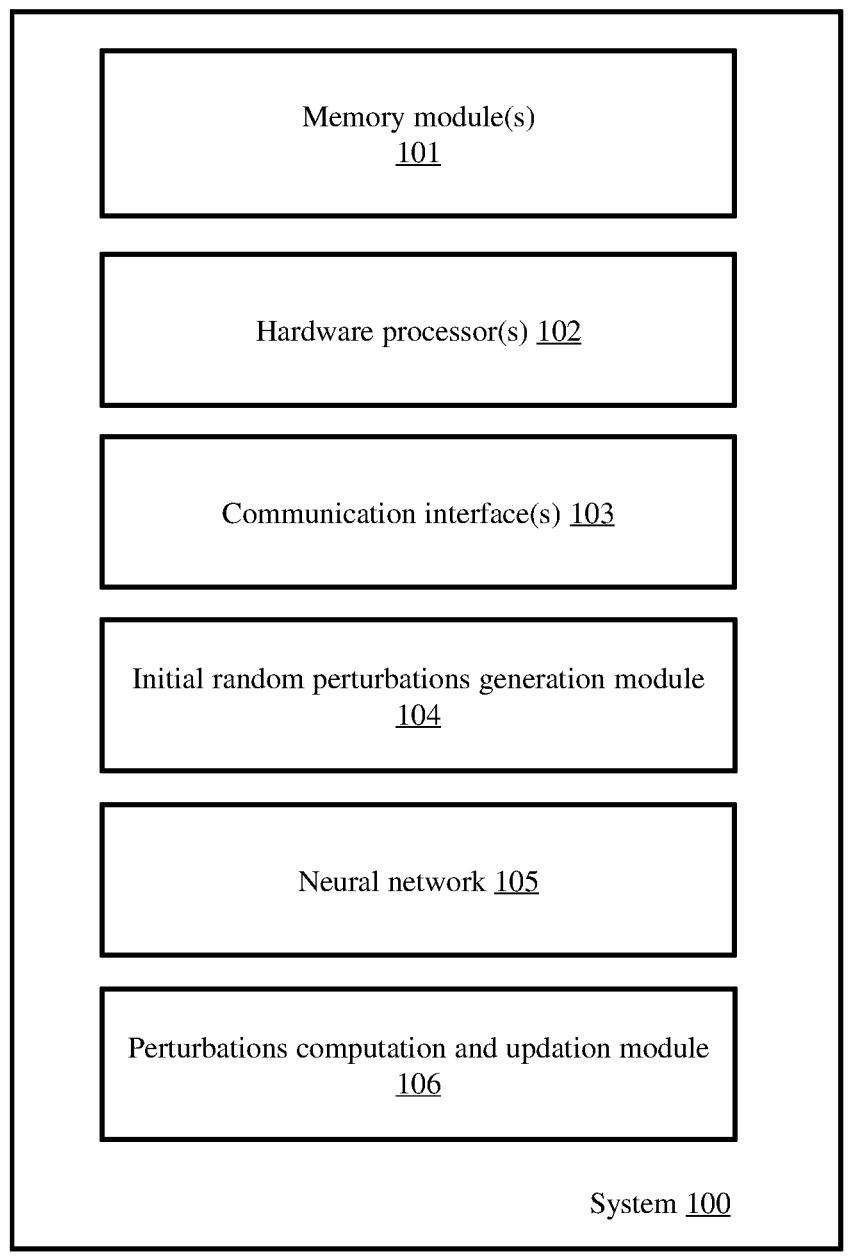
FIG. 1 illustrates an exemplary system for biometric template protection, according to some embodiments of the present disclosure.

FIG. 1 illustrates an exemplary system 100 for biometric template protection, according to some embodiments of the present disclosure. The system 100 includes one or more hardware processors 102, one or more communication interfaces or input/output (I/O) interfaces 103, one or more data storage devices or memory modules 101 operatively coupled to the one or more hardware processors 102, an initial random perturbations generation module 104, a neural network 105, and a perturbation computation and updation module 106.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The initial random perturbation generation module 104 can be configured to generate an initial perturbation value (BC) that matches contents of the biometric template being processed for providing biometric template protection. In an embodiment, the initial random perturbation generation module 104 maintains a database (not shown in FIG. 1) that stores information pertaining to different classes/categories of data, and value of BC corresponding to each class. In another embodiment, the initial random perturbation generation module 104 may be configured to provide one or more options for a user to configure/change values of BC for each class of data.

The neural network 105 is configured to collect feature vectors corresponding to data in a biometric template to be protected, and an initial random perturbation as inputs, and generate a second binary code (BC') based on the collected data. The neural network 105 is further configured to feed the generated BC' as input to the perturbations computation and updation module 106. The neural network 105 is further configured to collect an error generated at the perturbations computation and updation module 106 as an input (feedback in response to the generated BC') from the perturbations computation and updation module 106, compute perturbations as a function of gradients of the neural network 105, process the computed perturbations and the initial random perturbation to generate cumulative perturbations, and update value of BC' based on the feature vectors, and the cumulative perturbations. The neural network 105 may use any suitable mechanism such as but not limited to Fast Gradient Step Method (FGSM) for computing the perturbations. The neural network 105 is configured to repeat the process of computing perturbations and updating value of BC', till the feedback input from the perturbations computation and updation module 106 stops (when BC' becomes equal to value of a first binary code (BC)).

The perturbations computation and updation module 106 is configured to collect value of BC' as input from the neural network 105. The perturbations computation and updation module 106 is further configured to collect value of a first binary code (BC) as input. The perturbations computation and updation module 106 is then configured to compare the BC and BC' in an attempt to check whether value of BC' matches BC, and generate difference between BC and BC' as an error at the perturbations computation and updation module 106. The perturbations computation and updation module 106 is further configured to generate value of 'final perturbation' as equal to value of cumulative perturbations, when value of BC' is equal to value of BC. The perturbations computation and updation module 106 further maps the feature vectors and the final perturbation to BC, and stores this data in the memory module 101.

Figure 2:
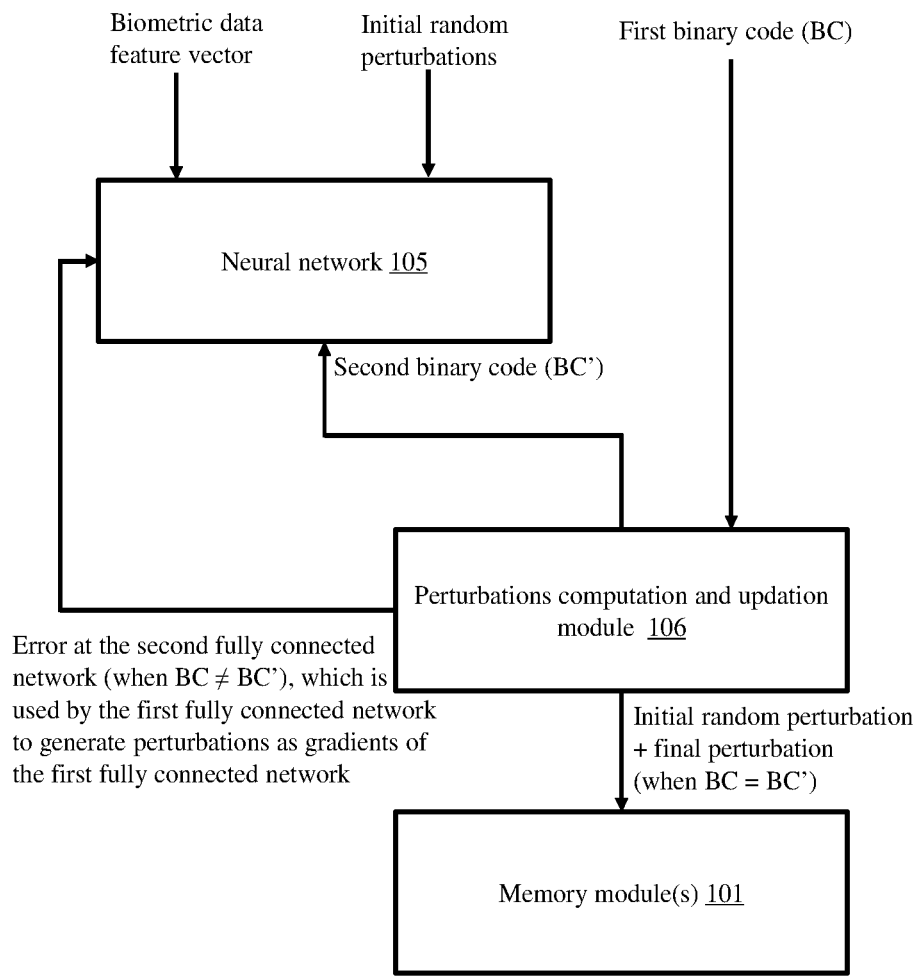
FIG. 2 illustrates data and control flow between different components of the system of FIG. 1 for providing biometric template protection, according to some embodiments of the present disclosure.

The data and control flow between different components of the system 100 is depicted in FIG. 2.

Figure 3:
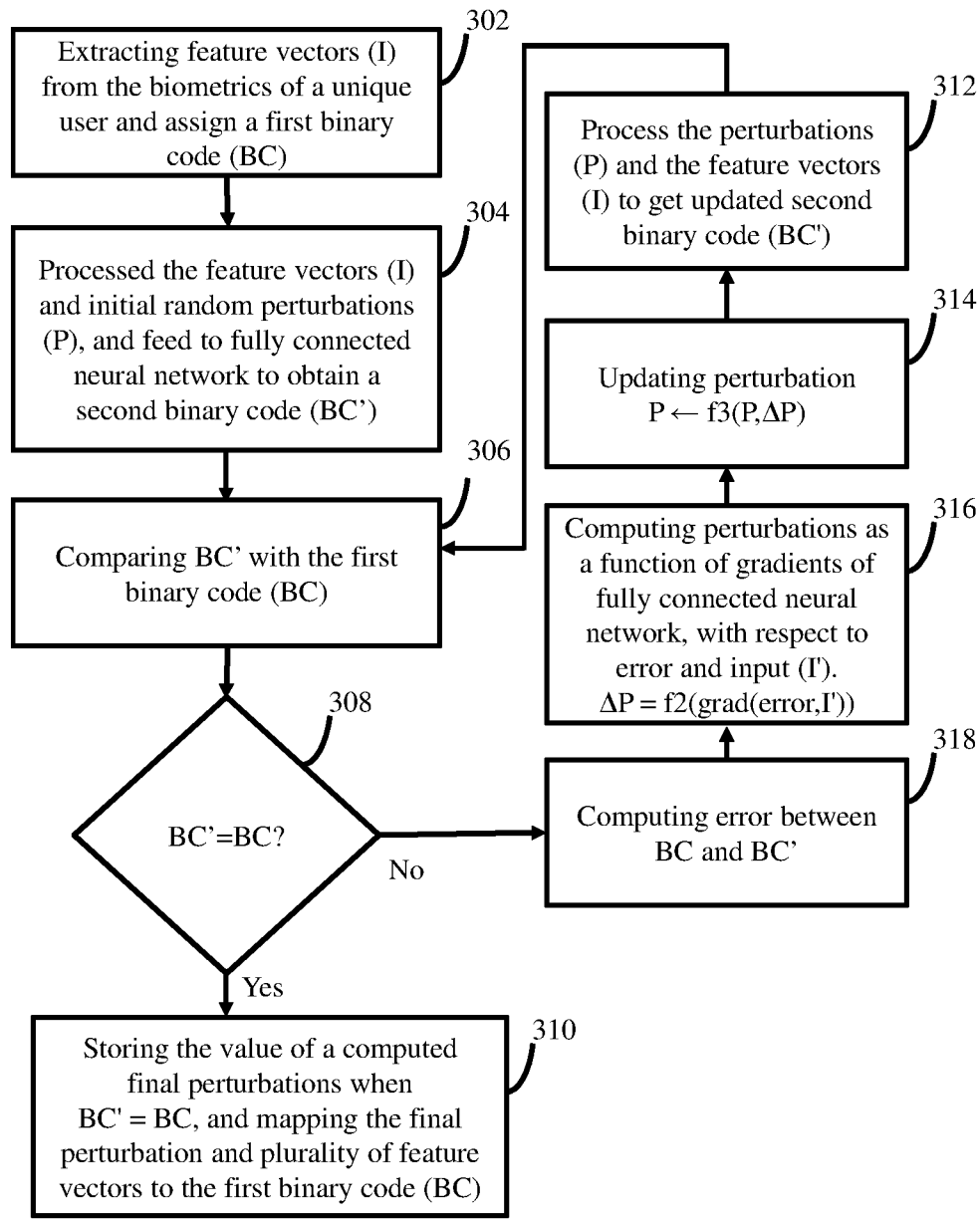
FIG. 3 is a flow diagram depicting steps involved in the process of providing biometric template protection using the system of FIG. 1, in accordance with some embodiments of the present disclosure.

FIG. 3 is a flow diagram depicting steps involved in the process of providing biometric template protection using the system of FIG. 1, in accordance with some embodiments of the present disclosure. Upon receiving a biometric template as input, the system 100 analyzes the biometric template and extracts (302) a plurality of feature vectors (I) corresponding to (biometric) data in the biometric template. A first binary code (BC), say 1001001, that matches a class of data present in the biometric template is identified and assigned to the biometric template, and in turn to the biometric data and the features extracted from the biometric data. In an embodiment, the value of BC that matches the data in the biometric template is randomly generated, maybe by using a uniform random bit generator, and is assigned. In another embodiment, one or more components of the system 100 can be trained using suitable machine learning techniques, using appropriate training data, which in turn allows the system 100 to identify value of BC that matches the biometric template being processed, and assign the identified value of BC to the biometric data. Further, the neural network 105 of the system 100, by processing (304) the feature vectors along with an initial random perturbation (P), generates value of a second binary code (BC'), say 1000001. The perturbations computation and updation module 106 of the system 100 then compares (306) the values of BC and BC' to identify if the values match. If the values of BC and BC' don't match, then the perturbations computation and updation module 106 generates (318) an error as equal to difference between BC and BC'. Then the neural network 105, by collecting and processing the error at the perturbations computation and updation module 106, generates (316) perturbation as a function of gradients of the neural network 105, with respect to the error and the input (I).'

$$\Delta P = f2(\text{grad}(\text{error}, I)) \tag{1}$$

The neural network 105 then process the computed perturbation to the initial random perturbation to generate (314) 'updated' cumulative perturbation (upgraded perturbation represented as P←f3(P,ΔP)). In various embodiments, 'processing' of the computed perturbation and the initial random perturbation to generate the cumulative perturbation may involve any suitable operation. Then, based on the cumulative perturbation and the feature vectors, the neural network 105 updates BC' (i.e. generates new value of BC'). Then the updated value of BC' is compared with BC by the perturbations computation and updation module 106. This process of generating an error at the perturbations computation and updation module 106, computing corresponding perturbations, generating cumulative perturbation, and updating BC' continues till BC is equal to BC'. With respect to generating the cumulative perturbation, it is to be noted that, when there is multiple iterations of generating error at the perturbations computation and updation module 106, accordingly, the perturbation computed at each iteration is processed with cumulative iteration at the previous iteration. This mechanism is represented in terms of equation below:

Assume that:
initial random perturbation is represented as 'X'
Perturbation computed corresponding to the error at the perturbations computation and updation module 106 in iteration 1 is '$Y_1$'
Then cumulative perturbation in iteration 1 is:

$$\text{Cumulative perturbation} = X + Y_1 \tag{2}$$

Assuming that there was a second iteration (before BC=BC'): Perturbation computed corresponding to the error at the perturbations computation and updation module 106 in iteration 1 is 'Y2'
Then cumulative perturbation in iteration 2 is:

$$\text{Cumulative perturbation} = X + Y_1 + Y_2 \tag{3}$$

When BC' is equal to BC, then the perturbations computation and updation module 106 generates (310) value of final perturbation as equal to cumulative perturbation when BC'=BC. Further, the feature vectors and the final perturbation are mapped to the first binary code (BC), and this data is stored in one or more of the memory modules 101. In various embodiments, one or more steps of method 300 may be performed in the same order or in an alternate order, as required. Further, one or more of the steps in method 300 may be skipped.

Every time the BC is compromised, a new value is generated and assigned to the first binary code (BC) as an updated first binary code, and a corresponding final perturbation is generated. Further, the generated final perturbation and the feature vectors are mapped to the (updated) first binary code (BC).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for biometric data protection, comprising:
    collecting a biometric template comprising at least one biometric data pertaining to a user, as an input, via one or more hardware processors;
    generating and assigning a first binary code (BC) to a class of the at least one biometric data in the biometric template, via the one or more hardware processors;
    generating a second binary code (BC') by collecting an initial random perturbation and a plurality of feature vectors pertaining to the at least one biometric data as input, via the one or more hardware processors, by a neural network of a system;
    till the BC' is at least equal to the BC:
        comparing the BC and the BC', via the one or more hardware processors, by a perturbations computation and updation module of the system;
        computing perturbations as a function of gradients of the neural network, based on an error generated at the perturbations computation and updation module for the BC and the BC', via the one or more hardware processors;
        processing the computed perturbations and the initial random perturbation to generate a cumulative perturbation, via the one or more hardware processors; and
        updating the BC' based on the plurality of feature vectors and the cumulative perturbations; and
    when the BC' is equal to the BC:
        computing value of final perturbation as equal to the cumulative perturbation; and
        mapping the final perturbation and the plurality of feature vectors to the first binary code;
    wherein, when the BC is compromised, the final perturbation is computed using a newly generated value of the BC to protect the biometric template.

2. The method of claim 1, wherein the error generated at the perturbations computation and updation module is determined as difference between the BC and the BC'.

3. The method of claim 1, wherein when the first binary code is compromised, the biometric template is protected by:
    generating a new value for the first binary code, as an updated first binary code;
    computing the final perturbation corresponding to the updated first binary code; and
    mapping the plurality of feature vectors and the generated final perturbation, to the updated first binary code.

4. The method of claim 1, wherein the first binary code (BC) is randomly generated, and error-corrected using at least one error correction code.

5. The method of claim 1, wherein the first binary code (BC) is generated by at least one of the neural network and the perturbations computation and updation module, and wherein at least one of the neural network and the perturbations computation and updation module are trained using training data pertaining to selection of BC for different classes of biometric data, to identify a value of BC that matches the class of the biometric data in the biometric template.

6. A system, comprising:
    a memory module storing a plurality of instructions;
    one or more communication interfaces;
    an initial perturbations generation module;
    a neural network;
    a perturbations computation and updation module; and
    one or more hardware processors coupled to the memory module via the one or more communication interfaces, wherein the one or more hardware processors are configured by the instructions to:
        collect a biometric template comprising at least one biometric data pertaining to a user, as an input;
        generate and assign a first binary code (BC) to a class of the biometric data in the at least one biometric template, by the initial perturbations generation module;
        generate a second binary code (BC') by collecting an initial random perturbation and a plurality of feature vectors pertaining to the at least one biometric data as input, by the neural network;
        till the BC' is at least equal to the BC:
            compare the BC and the BC', for the perturbations computation and updation module;
            compute perturbations as a function of gradients of the neural network, based on a an error generated at the perturbations computation and updation module for the BC and the BC';
            process the computed perturbations and the initial random perturbation to generate a cumulative perturbation; and
            update the BC' based on the plurality of feature vectors and the cumulative perturbations; and
        when the BC' is equal to the BC:
            compute value of final perturbation as equal to the cumulative perturbation; and
            map the final perturbation and the plurality of feature vectors to the first binary code;
        wherein, when the BC is compromised, the final perturbation is computed using a newly generated value of the BC to protect the biometric template.

7. The system of claim 6, wherein the system is configured to determine the error at the perturbations computation and updation module as difference between the BC and the BC'.

8. The system of claim 6, wherein the system is used to protect the biometric template when the first binary code is compromised, by:
  generating a new value for the first binary code, as an updated first binary code;
  generating the final perturbation corresponding to the updated first binary code; and
  mapping the plurality of feature vectors and the generated final perturbation, to the updated first binary code.

9. The system of claim 6, wherein the system is configured to randomly generate value of the first binary code (BC), wherein BC is error-corrected using at least one error correction code.

10. The system of claim 6, wherein the system is configured to generate the first binary code (BC) by using at least one of the neural network and the perturbations computation and updation module, and wherein the at least one of the neural network and the perturbations computation and updation module is trained using a training data pertaining to selection of BC for different classes of biometric data, to identify a value of BC that matches the class of the biometric data in the biometric template.

11. A non-transitory computer readable medium storing instructions for biometric data protection, comprising:
  collecting a biometric template comprising at least one biometric data pertaining to a user, as an input, via one or more hardware processors;
  generating and assigning a first binary code (BC) to a class of the at least one biometric data in the biometric template, via the one or more hardware processors;
  generating a second binary code (BC') by collecting an initial random perturbation and a plurality of feature vectors pertaining to the at least one biometric data as input, via the one or more hardware processors, by a neural network of a system;
  till the BC' is at least equal to the BC:
    comparing the BC and the BC', via the one or more hardware processors, by a perturbations computation and updation module of the system;
    computing perturbations as a function of gradients of the neural network, based on an error generated at the perturbations computation and updation module for the BC and the BC', via the one or more hardware processors;
    processing the computed perturbations and the initial random perturbation to generate a cumulative perturbation, via the one or more hardware processors; and
    updating the BC' based on the plurality of feature vectors and the cumulative perturbations; and
  when the BC' is equal to the BC:
    computing value of final perturbation as equal to the cumulative perturbation; and
    mapping the final perturbation and the plurality of feature vectors to the first binary code;
  wherein, when the BC is compromised, the final perturbation is computed using a newly generated value of the BC to protect the biometric template.

12. The non-transitory computer readable medium of claim 11, wherein the error generated at the perturbations computation and updation module is determined as difference between the BC and the BC'.

13. The non-transitory computer readable medium of claim 11, wherein when the first binary code is compromised, the biometric template is protected by:
  generating a new value for the first binary code, as an updated first binary code;
  computing the final perturbation corresponding to the updated first binary code; and
  mapping the plurality of feature vectors and the generated final perturbation, to the updated first binary code.

14. The non-transitory computer readable medium of claim 11, wherein the first binary code (BC) is randomly generated, and error-corrected using at least one error correction code.

15. The non-transitory computer readable medium of claim 11, wherein the first binary code (BC) is generated by at least one of the neural network and the perturbations computation and updation module, and wherein at least one of the neural network and the perturbations computation and updation module are trained using training data pertaining to selection of BC for different classes of biometric data, to identify a value of BC that matches the class of the biometric data in the biometric template.

* * * * *